US012017946B2

(12) United States Patent
Becker Del Río et al.

(10) Patent No.: US 12,017,946 B2
(45) Date of Patent: Jun. 25, 2024

(54) SUPPORT BLOCK WITH INDIVIDUAL HOLLOW SECTIONS FOR A MACHINE FOR FORMING GLASS ARTICLES, AND MANUFACTURING METHOD

(71) Applicant: Vitro, S.A.B. de C.V., Monterrey (MX)

(72) Inventors: Alejandro Becker Del Río, Atizapan de Zaragoza (MX); Victor Tijerina Ramos, Monterrey (MX)

(73) Assignee: Vitro, S.A.B. de C.V., Monterrey (MX)

( * ) Notice: Subject to any disclaimer, the term of this patent is extended or adjusted under 35 U.S.C. 154(b) by 153 days.

(21) Appl. No.: 17/287,373

(22) PCT Filed: Oct. 22, 2018

(86) PCT No.: PCT/MX2018/000109
§ 371 (c)(1),
(2) Date: Apr. 21, 2021

(87) PCT Pub. No.: WO2020/085891
PCT Pub. Date: Apr. 30, 2020

(65) Prior Publication Data
US 2021/0387889 A1    Dec. 16, 2021

(51) Int. Cl.
*C03B 9/353*     (2006.01)
*C03B 9/193*     (2006.01)

(52) U.S. Cl.
CPC ............ *C03B 9/353* (2013.01); *C03B 9/1932* (2013.01)

(58) Field of Classification Search
CPC .................................................. C03B 9/353
See application file for complete search history.

(56) References Cited

U.S. PATENT DOCUMENTS 1,911,119 A     5/1933   Ingle
3,329,492 A *   7/1967   Kinsley .................. C03B 9/193
                                                 65/307
(Continued)

FOREIGN PATENT DOCUMENTS

CA        2393204 A1     6/2001
EP        0037799 A2    10/1981
(Continued)

*Primary Examiner* — Erin Snelting
(74) *Attorney, Agent, or Firm* — The Webb Law Firm

(57) ABSTRACT

The present invention relates to a support block with individual hollow sections, for a machine for forming glass objects, and to its manufacturing method. The support block comprises: a single-piece support body formed by a front wall, a rear wall and lateral walls, thus forming a hollow rectangular body; an intermediate wall and a plurality of cross walls located inside the internal periphery of the support body, in a grid arrangement, forming a first plurality of hollow sections aligned along the front wall and a second plurality of hollow sections aligned along the rear wall, each first hollow section and each second hollow section being aligned and disposed one behind the other; a support section for each first hollow section and each second hollow section, each support section being connected near to the bottom part of each of the walls forming each first hollow section and each second hollow section, to support the different mechanisms of the machine for forming glass objects; tubular cavities located in a vertical position for each plurality of cross walls, for inserting lubricating pipes or cables, the tubular cavities being formed between each of the cross walls located inside the periphery of the support body; and aligning means located in a bottom part of the support body, for aligning the support block with respect to a determined installation area.

9 Claims, 5 Drawing Sheets

(56) References Cited

U.S. PATENT DOCUMENTS

| | | | |
|---|---|---|---|
| 3,370,934 A | * | 2/1968 | Smith .................... C03B 9/48 |
| | | | 420/17 |
| 4,362,544 A | | 12/1982 | Mallory |
| 4,596,591 A | | 6/1986 | Nebelung et al. |
| 5,833,732 A | * | 11/1998 | Roberts ............... C03B 9/369 |
| | | | 65/227 |
| 5,858,050 A | | 1/1999 | Slocum et al. |
| 2004/0216491 A1 | | 11/2004 | Sasso |
| 2010/0018255 A1 | | 1/2010 | Balbi |
| 2017/0197860 A1 | | 7/2017 | Vorspel |

FOREIGN PATENT DOCUMENTS

| | | |
|---|---|---|
| EP | 0153801 A1 | 9/1985 |
| EP | 1136453 A1 | 9/2001 |
| EP | 1491508 A1 | 12/2004 |
| EP | 2145860 A1 | 1/2010 |
| IT | MI982383 A1 | 5/1999 |
| JP | 11-199239 A | 7/1999 |
| JP | 11-199240 A | 7/1999 |

\* cited by examiner

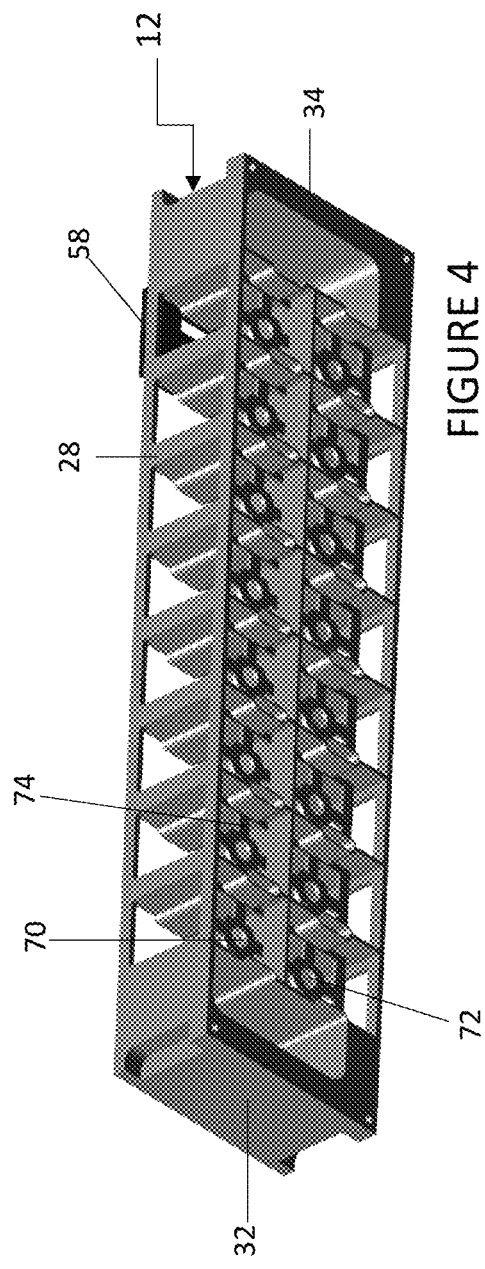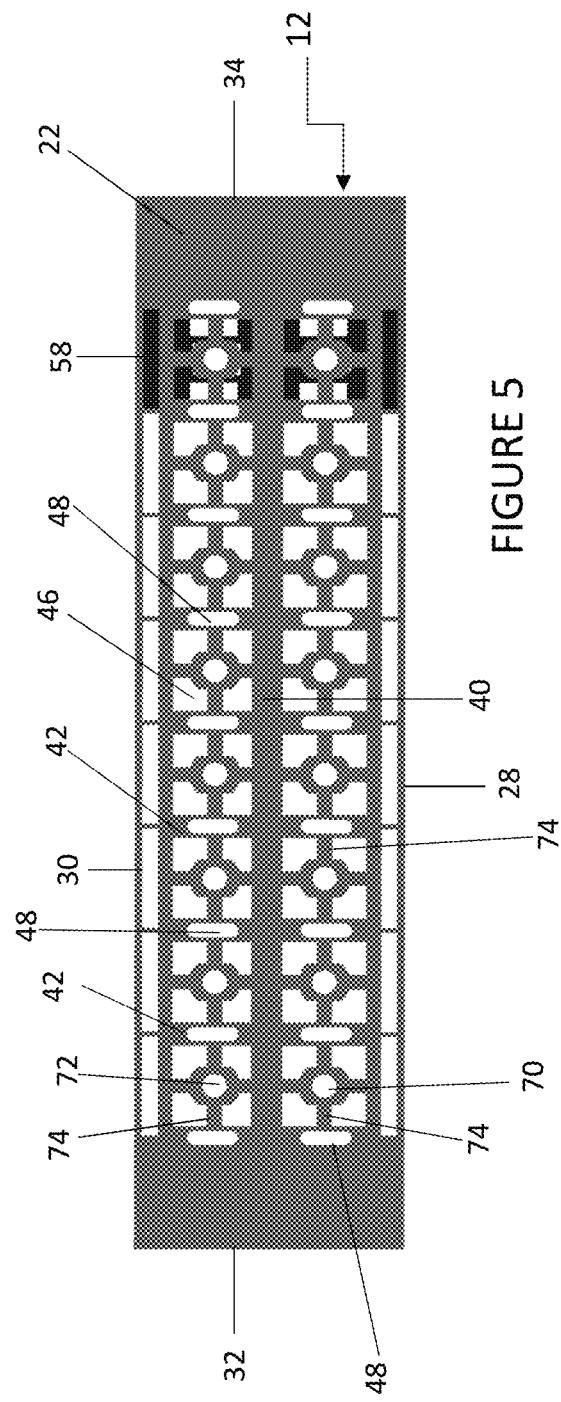

SUPPORT BLOCK WITH INDIVIDUAL HOLLOW SECTIONS FOR A MACHINE FOR FORMING GLASS ARTICLES, AND MANUFACTURING METHOD

CROSS-REFERENCE TO RELATED APPLICATION

This application is the United States national phase of International Application No. PCT/MX2018/000109 filed Oct. 22, 2018, the disclosure of which is hereby incorporated by reference in its entirety.

FIELD OF THE INVENTION

The present invention relates to glassware forming machines, and more particularly to a single piece hollow individual section support block for a glassware forming machine.

BACKGROUND OF THE INVENTION

Glass articles such as narrow-mouth glass containers are typically produced on article-forming machines that include similar individual forming sections, by the blow-blow process, while wide-mouth jars, glasses and other glass articles are produced in the forming machines known as series "E" and "F" through the press-blow process, in the so-called "hot mold".

One of the earliest single section glass containers forming machine is described in the U.S. Pat. No. 1,911,119, which includes a parison or preform forming station and a final article blowing or forming station. Each of the individual stations are mounted on individual frames. So, during the manufacturing process of the containers through the blow-blow process or blow press, the glass in the form of gobs is introduced into a parison or pre-formed mold in the parison forming station, where, depending on the process, the gob settles by means of a blowing or vacuum process, to the lower part of the parison mold, to form the crown of the container. Then, once the crown of the container is formed, a counterblow is made to form a parison or preform of the container. Subsequently, the preform of the container is transferred by means of an inversion mechanism, with a 180 degrees movement of said parison mold, to a final blow mold of the forming or final blowing station, where the final form is given to the container. Finally, the newly formed container is transferred by a pusher mechanism to a dead plate at the front of the machine and is then carried by means of a conveyor belt to a tempering furnace.

For both parison forming and final blowing of glass articles, the parison or preform forming station and the final article blowing or forming station include a series of mold halves, opposed to each other. These mold halves are retained by a mold opener-spill mechanism, which moves between open and closed positions, to open and close the parison or final blow mold halves during the article forming process.

Generally, the frame on which the mechanisms of the parison or final blow stations are coupled includes a support base and side walls forming a rectangular hollow support block (modular section or frame). And, finally a cap to cover the top of the hollow support block. The cover includes a series of holes on which each of the mechanisms is placed and screwed in each modular section of each forming station.

Considering the machine construction system based on individual modules, it is possible to build 8-section, 10-section and 12-section machines. However, even though this presents an advantage for the construction of machines with several individual sections, it is necessary to manufacture the hollow rectangular support blocks in parts, that is, they are assembled on the basis of steel or iron plates, which have to be machined, welded and bolted to the integrating support base.

Once each of the individual modules have been formed, they are placed on a support structure where they are placed side by side to be aligned with one another. The support base includes lateral support modules, which are placed at the ends of said support base where they locate vertical columns that will support an intermediate beam and an upper beam to retain the other mechanisms of the forming stations.

The whole machine with all its mechanisms is taken to the factory for the manufacture of the articles, which is placed on support beams to be correctly aligned.

An example of a structure for the construction of a 10-section single section glassware forming machine is illustrated in U.S. Pat. No. 4,362,544 assigned to Owens-Illinois, which incorporates all valves into the machine frame. and control piping needed to operate all sections of the machine in accordance with any of a number of different types of processes, resulting in a significant decrease in the proliferation of piping and valves that were previously required to be added to the machine and then they were withdrawn from it, since the operation of the machine was changed from one type of forming process to another. The apparatus of this invention further applies individual controls to effect cooling of each parison mold cavity and each blow mold cavity of each multi-cavity section of the machine.

However, some of the problems detected in the construction of the IS forming machines are related to the manufacture of the same individual modules, that is, due to the fact that the assembly of rectangular hollow support blocks of each module is individual, it is necessary carry out more machining for the elaboration of the pieces, which increases manufacturing costs.

Another problem that has been encountered is that the individual modules, when manufactured and installed individually in the base support structure of the machine, present greater vibration and bending during the process of forming the articles.

A further disadvantage of individual modules is that, being individually installed in the machine support structure, each module is required to be perfectly aligned with one another.

It has also been found that individual modules or sections exhibit greater thermal linear expansion due to temperature during the manufacture of glassware.

Therefore, the present invention relates to an integral support block with individual hollow sections (base more integrated hollow sections), for a glass article forming machine, which integrates in a single piece all possible sections or individual modules of a machine IS machine, being able to build integrally from two to 12 or more sections per machine.

The hollow support integral block consisting of: a support body of nodular or ductile iron, gray iron or similar material, in a single piece, having a front wall, a rear wall and side walls; at least one intermediate wall and at least one cross wall located within the periphery of the support body, located in a grid relationship, formed a first plurality of integrated hollow sections aligned along the entire length of the front wall and, a second plurality of sections hollows aligned along the entire length of the rear wall, each first hollow section and each second hollow section being aligned and positioned in a relationship one behind the other; the front wall and rear wall including an open hole or window in registration with each first hollow section and second hollow section; a support section for each first hollow section and each second hollow section, said support section being connected near the bottom of each of the walls that form each first and second hollow section, to support the various mechanisms of the machine for forming glass articles; and, tubular cavities located in a vertical position by each one of the plurality of cross walls, for the introduction of lubrication conduits or cables, said tubular cavities being formed between each one of the cross walls that are located within the periphery of the support body.

The integral support block with individual hollow sections includes cover means for each of the open hollows or windows of each first hollow section and second hollow section, which engage and disengage at the side of each front wall and rear wall (for entry of a man), to open or close the first hollow sections and second hollow sections for repair or maintenance of the mechanisms of each article-forming section; and, at least one cover to cover the upper part and the lower part of each first hollow section and second hollow section, for the configuration of individual plenum chambers or for the integration of an air supply duct, said upper cover section supporting each of the mechanisms of the parison forming or final blowing stations of the glass articles.

OBJECTIVES OF THE INVENTION

Therefore, one of the objectives of the present invention is to provide a single-piece hollow individual section support block for a glassware forming machine and its manufacturing method, which separates the sections into two chambers, one for the parison station and another for the final blow, which, once it is assembled with all its parts, allows to provide independent cooling flows, for the parison side and for the mold side, handling different pressures and different air flows to support the various mechanisms of the machine for forming glass articles (ft$^3$/min).

It is another objective of the present invention, to provide a support block with hollow individual sections, in a single piece, for a glass article forming machine and its manufacturing method, which facilitates the construction of the structure, reducing the machining for the elaboration of the parts of the individual chambers.

It is a further objective of the present invention to provide a support block with hollow individual sections, in a single piece, for a glass article forming machine and its manufacturing method, which reduces the vibration of the forming sections.

A further objective of the present invention is to provide a support block with hollow individual sections, in a single piece, for a glass article forming machine and its manufacturing method, which does not require the alignment of each of the individual sections anymore that, being the structure of a single piece, the modules are already aligned from origin in the machine.

Another objective of the present invention is to provide a support block with hollow individual sections, in a single piece, for a machine for forming machine glass articles and its manufacturing method, which reduces the effect of thermal stresses and is more resistant to support the loads.

A further object of the present invention is to provide a provide a support block with hollow individual sections, in a single piece, for a machine for forming machine glass articles and its manufacturing method, which integrates the support base and the frame in a single piece.

These and other objects and advantages of the present invention will become apparent to those of ordinary skill in the field from the following description of a specific and preferred embodiment of the invention, provided in combination with the accompanying drawings.

BRIEF DESCRIPTION OF THE DRAWINGS

FIG. 4 is a conventional perspective view showing the lower part of the support block with individual hollow sections of the present invention;

FIG. 5 is a plan view showing the lower part of the support block with individual hollow sections of the present invention;

DETAILED DESCRIPTION OF THE INVENTION

Next, a support structure 10 for a machine for forming glass articles will be described. However, due to the number of mechanisms that are involved in the manufacture of a glass article, namely a parison forming station and another final blowing station and many other mechanisms, these will not be illustrated.

Figure 1:
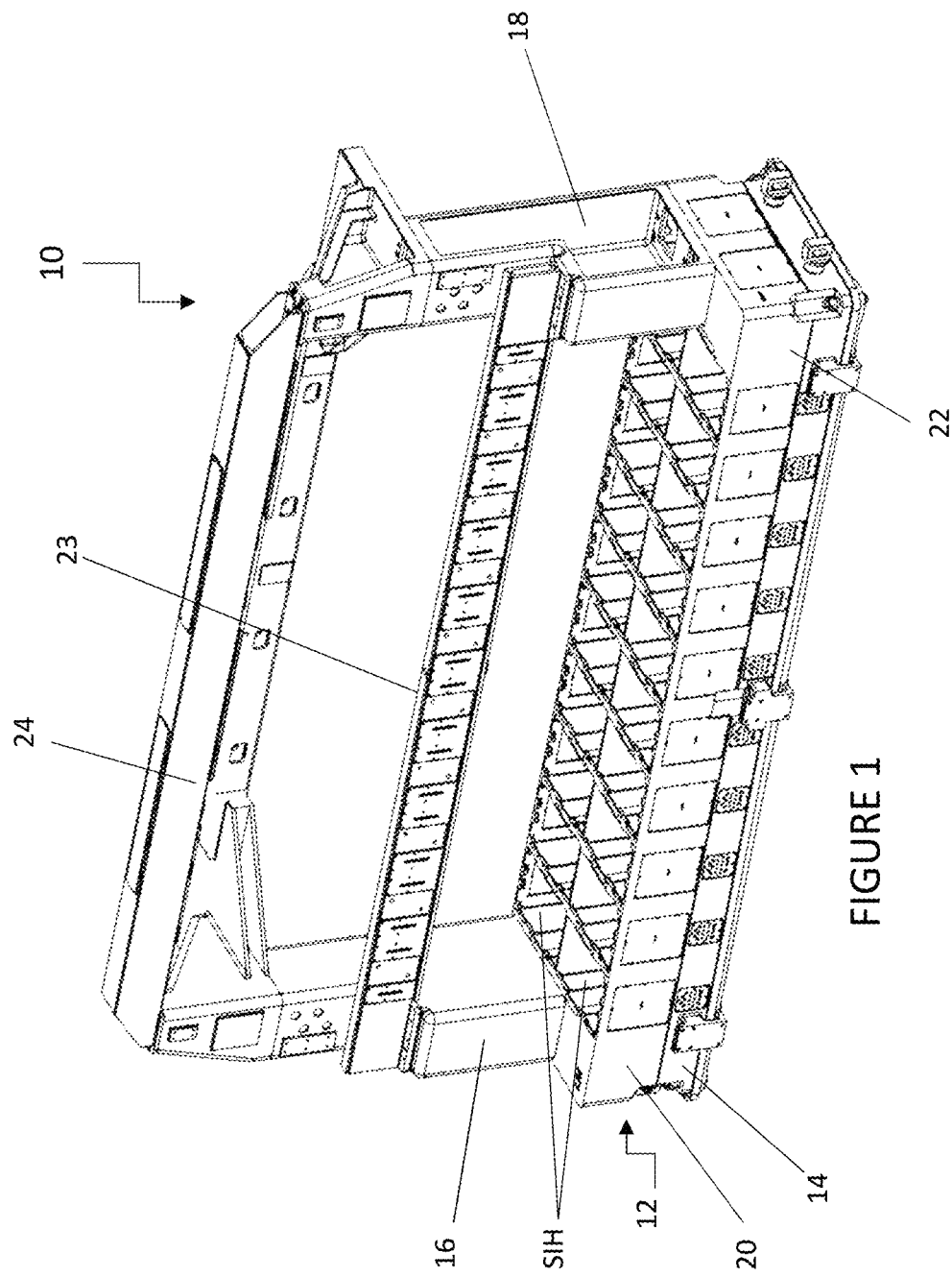
FIG. 1 is a conventional perspective view of a support structure for a machine for forming glass articles including the single-piece hollow individual section support block of the present invention.
Figure 2:
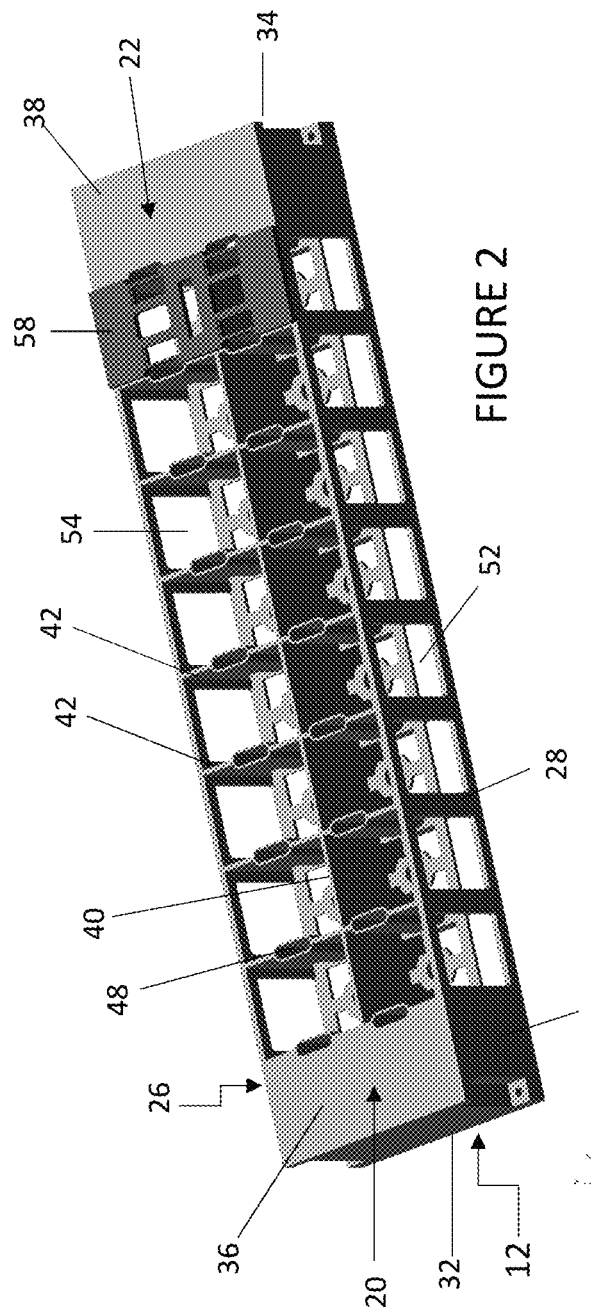
FIG. 2 is a conventional perspective view showing the upper part of the support block with individual hollow sections of the present invention.
Figure 3:
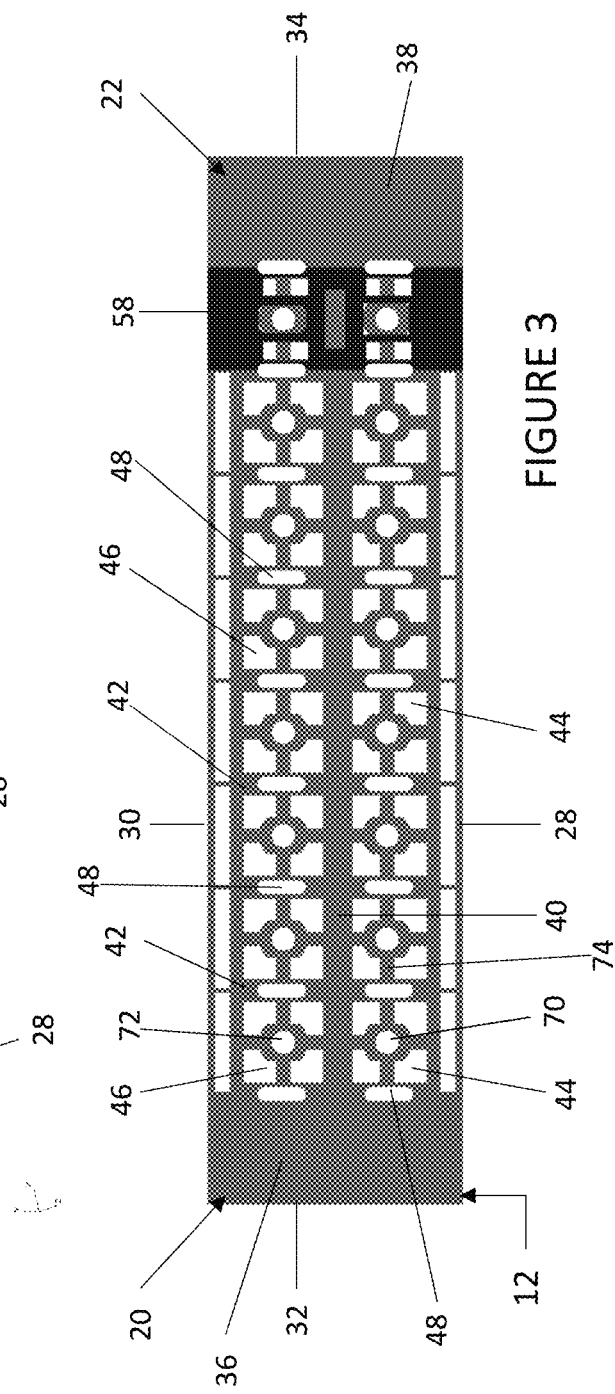
FIG. 3 is a plan view showing the upper part of the support block with individual hollow sections of the present invention.

As seen in FIG. 1, the support structure 10 comprises a support block 12 with individual hollow sections SIH, in a single piece, having an integrated base 14, which will be described in detail later. In said FIG. 1 the support structure 10 configured for a machine with eight individual sections is shown. A pair of vertical columns 16, 18, are coupled in hollow support sections 20, 22, of the support block 12, which are located at the ends of said support block 12; and, a pair of cross members 23, 24, are fixed on top of the vertical columns 16, 18, to retain various mechanisms (not shown) of the forming machine.

Now, referring in detail to the support block 12 with individual hollow sections SIH of the present invention, it will be described in accordance with FIGS. 2 to 6. Said support block 12 with individual hollow sections SIH consists mainly of: a support body 26 of ductile or nodular iron, in a single piece, consisting of: a front wall 28, a rear wall 30 and side walls 32, 34, forming a hollow rectangular body. The hollow support sections 20, 22, formed at both ends of the hollow rectangular body, include a cover 36, 38, to support the pair of vertical columns 16, 18.

An intermediate wall 40 located in a perpendicular position with respect to the support sections 20, 22, is located in the central part and in a parallel position with respect to the front wall 28 and rear wall 30; and, cross walls 42 positioned perpendicularly to front wall 28 and rear wall 30 and aligned and spaced parallel to side walls 32, 34.

The arrangement of intermediate wall 40 and cross walls 42, being configured within the inner periphery of support block 12, in a grid relationship, forming a first plurality of hollow sections 44 aligned along the entire length of front wall 28, at which would locate the mechanisms corresponding to the final forming station of the glass article; and, a second plurality of hollow sections 46 aligned along the entire length of the rear wall 30, in which the mechanisms corresponding to the parison forming station would be located, each hollow section 44 and hollow section 46 being aligned and located in a relationship one behind the other; the cross walls 42 including tubular cavities 48 located vertically by each of the hollow sections 44, 46, for the introduction of lubrication conduits or cables, said tubular cavities 48 being formed between each of the cross walls 42.

The front wall 28 and rear wall 30 of the support block 12, including an open side hole 52, 54 (FIGS. 2, 4 and 7) in registration with each of the first plurality of hollow sections 44 and, second plurality of hollow sections 46. Cover caps 56 (FIG. 7), of cast material, for each of the open side holes 52, 54, of each first plurality of hollow sections 44 and, second plurality of hollow sections 46, which are coupled and uncoupled in the part side of each front wall 28 and rear wall 30, for laterally opening or closing the hollow sections 44, 46, for repair of the mechanisms of each article-forming section.

The support block assembly 12 being made of ductile or nodular iron which exhibits high compressive strength, mouldability, abrasion resistance, machinability, and fatigue resistance. It can also be made of gray iron or similar materials such as structural materials or steel plates.

An upper cover 58 (FIG. 6) and a lower cover 60 (FIG. 6), of a cast metal of ductile or ductile iron, gray iron or similar material to respectively cover and seal the upper part and the lower part of each of the first plurality of hollow sections 44 and, second plurality of hollow sections 46, thereby defining independent plenum chambers for each forming station. This arrangement allows to provide independent cooling flows, with a stable pressure for the mold side and for the parison side, handling different pressures and different air flows. The upper cover 58, having an arrangement of perforations and recesses to couple each of the mechanisms of the parison forming stations or final blow of the glass articles (FIG. 7).

The lower cover 60 including a central holes 62, 64, (FIG. 6) for the independent introduction of pressurized air through ducts 66, 68, to each of the first plurality of hollow sections 44 and, second plurality of hollow sections 46.

Each of the first plurality of hollow sections 44 and, second plurality of hollow sections 46, having a support section 70, 72, said support section 70, 72, being connected by cross arms 74, at the bottom of each section hollow 44 and 46, which have been formed by the union of each front wall 28, rear wall 30, intermediate wall 40 and cross walls 42. Each support section 70, 72, supporting a piston mechanism and a bottom plate mechanism (not shown).

In addition to the above, the support base 14 of the support block 12 with individual hollow sections SIH also comprises: a bolt-based alignment system 76, which are placed in the corners of the support base 14, to facilitate the complete machine alignment during installation at the factory.

Figure 6:
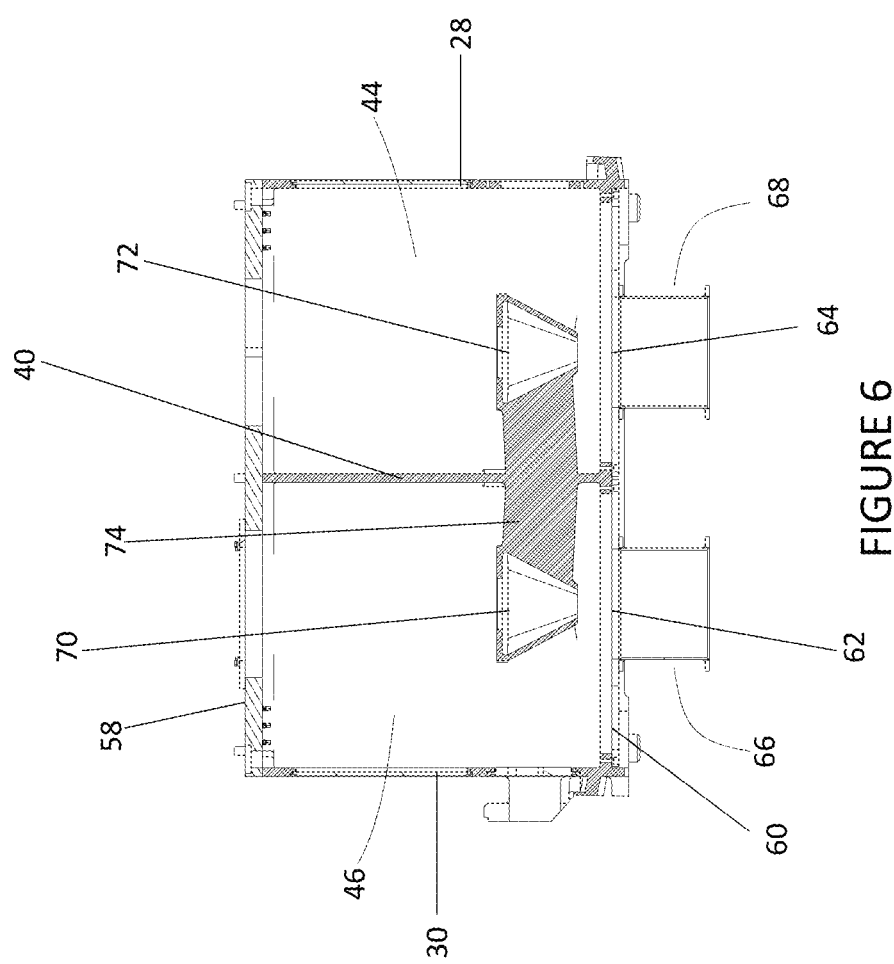
FIG. 6 is a cross-sectional view, showing the mold side and parison side chambers of the support block with individual hollow sections of the present invention; and, FIG. 7 is a conventional perspective view, in detail, showing the assembly of the parts in the support block with individual hollow sections of the present invention.
Figure 7:
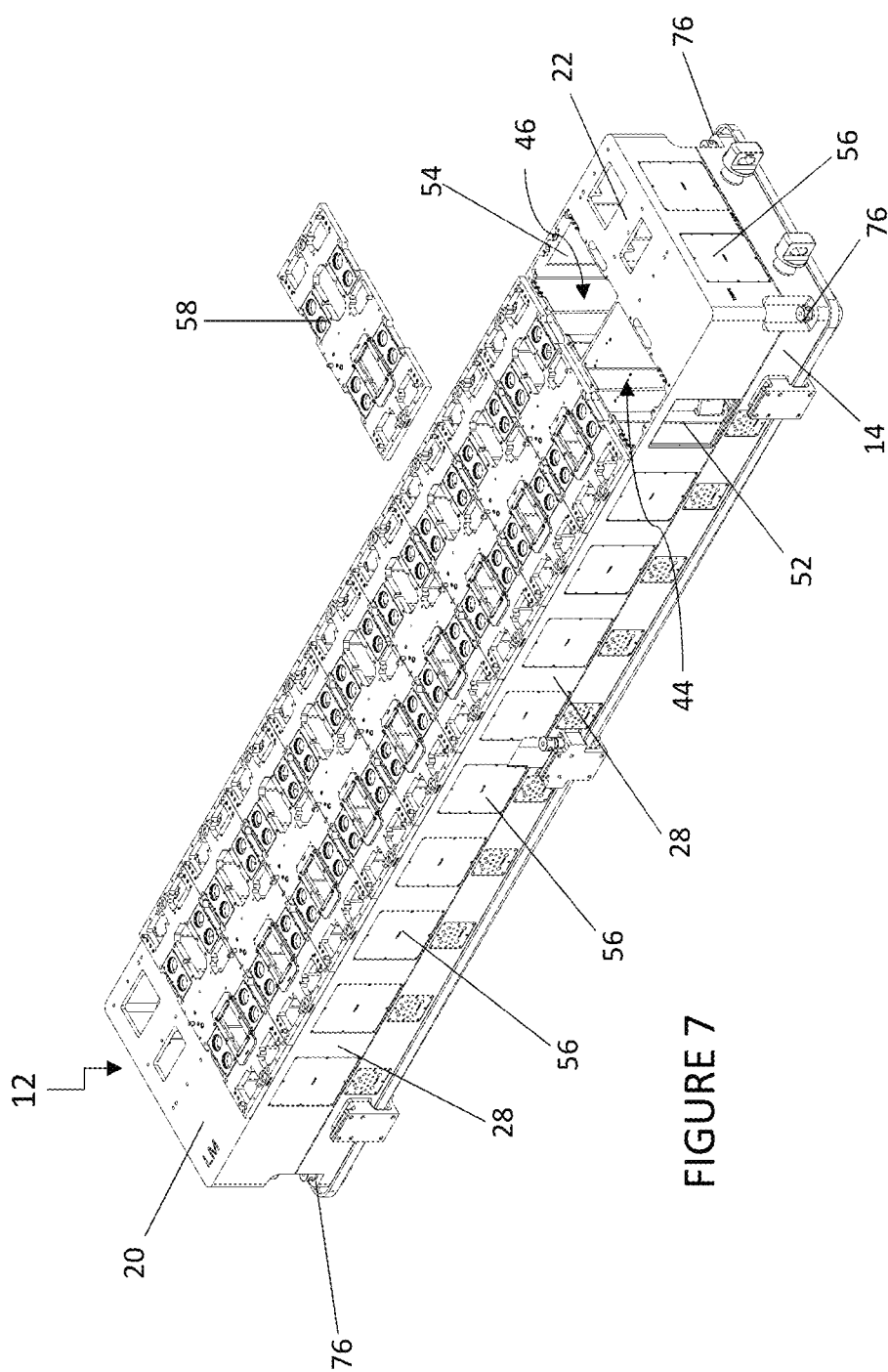

In a second embodiment of the present invention, it is important to consider that even though it has been mentioned that the front wall 28 and rear wall 30 of the support block 12 include an open side hole 52, 54 (FIGS. 2, 4 and 7) in registration with each of the first plurality of hollow sections 44 and, second plurality of hollow sections 46, these can be totally closed, and will not necessarily require the cover covers 56 (FIG. 7), so the repair of the mechanisms of each article-forming section can be carried out from the top or bottom, removing the upper cover 58 and/or lower cover 60 (FIG. 6).

In a third embodiment of the present invention, the support block assembly 12 can be formed of single-piece steel plates, that is, the front wall 28, the rear wall 30 and the intermediate wall are located on the base of support 14 and assembled at their ends with the side walls 32, 34, forming a hollow rectangular body divided into two halves, all of them joined by welding. Then, the cross walls 42 are positioned within the inner periphery of the support block 12, in a grid relationship, forming a first plurality of hollow sections 44 aligned along the entire length of the front wall 28; and, a second plurality of hollow sections 46 aligned along the entire length of the rear wall 30, each hollow section 44 and hollow section 46 being aligned and positioned in a relationship one behind the other.

As described above, FIGS. 1 to 5 show the construction of a support block 12 with individual hollow sections SIH for an 8-section machine and FIG. 7 shows an arrangement for a 10-section machine.

However, the support block construction can be manufactured for any number of sections, maintaining all the advantages described above.

Therefore, a method of constructing a support block with individual hollow, single-piece sections for a machine for forming glass articles comprising the steps of:

constructing a support block comprising integrally constructing by casting, a support body of nodular or ductile iron, gray iron or similar material, comprising a base section, a front wall, a rear wall and side walls forming a hollow interior space between them; at least one intermediate wall and at least one cross wall located within the periphery of the support body, said intermediate walls and cross walls being located in a grid relationship, forming a first plurality of integrated hollow sections aligned along the entire length of the front wall and, a second plurality of hollow sections aligned along the entire length of the rear wall; and a support section for each first hollow section and each second hollow section, said support section being connected near the bottom of each of the walls that form each first and second hollow section, to support various mechanisms of a machine glassware former; and, providing at least one cover of nodular or ductile iron, gray iron or similar material, to cover the upper part and the lower part of each first hollow section and each second hollow section, for the configuration of individual plenum chambers or for the integration of an air supply duct, said upper cover section supporting each of the mechanisms of the parison forming or final blowing stations of the glass articles.

The method of constructing a support block with hollow individual sections, in a single-piece, for a machine for forming glass articles, wherein each first hollow section and each second hollow section are aligned and positioned in a one-behind-the-other relationship. other.

The method of constructing a support block with individual hollow sections, in a single-piece, for a machine for forming glass articles, including the step of: forming tubular cavities located vertically by each of the plurality of the cross walls, for the introduction of lubrication conduits or cables, said tubular cavities being formed between each of the cross walls that are located within the periphery of the support body.

The method of constructing a support block with individual hollow sections, in a single-piece, for a machine for forming glass articles, including the steps of:

forming an open hole or window in the front wall and rear wall in registration with each first hollow section and second hollow section of the support block; and, providing cover means of nodular or ductile iron, gray iron or similar material, for each of the open holes or windows of each first hollow section and second hollow section, which are coupled and uncoupled on the side of each front wall and rear wall, for opening or closing the first hollow sections and second hollow sections for repair or maintenance of the mechanisms of each article-forming section.

As can be seen in FIGS. 1 to 5, what has been described is the construction of a support block 12, in a single piece, with predefined individual sections, in preparation for the location of the various mechanisms conforming the parison and final blow forming station.

Therefore, it should be understood that the configuration of the independent plenum chambers, for each forming stations, are formed when the upper cover 58, the lower cover 60, and the cover caps 56 are assembled respectively on the support block 12. This arrangement will allow to provide independent cooling flows, with a stable pressure for the mold side and for the parison side, handling different pressures and different air flows.

As can be seen from the above, the construction support 12, with individual hollow sections SIH, in a single piece, for a glass article forming machine has been described, which can be manufactured for any section article manufacturing machine, while retaining all the advantages described above. Therefore, it will be evident to those skilled in the art that many other features or improvements could be made, which can be considered within the scope determined by the following claims.

The invention claimed is:

1. A support block with individual hollow sections, for a machine for forming glass articles of the type comprising: a hollow single-piece support body, formed by a front wall, a rear wall and side walls; at least one intermediate wall located in a central part of the support body and in a parallel position with respect to the front wall and the rear wall and a plurality of cross walls located within an inner periphery of the support body, in a grid relationship, forming a first plurality of hollow sections aligned along the front wall and, a second plurality of hollow sections aligned along the rear wall, each first hollow section and each second hollow section being aligned and positioned in a relationship one behind the other; a support section for each first hollow section and each second hollow section, said support section being connected near a bottom of each of the walls that form each first and second hollow section, to support one or more mechanisms of the machine for forming glass articles; tubular cavities located in a vertical position by each of the plurality of hollow sections, for the introduction of lubrication conduits or cables, said tubular cavities being formed between each one of the cross walls and parallel with each one of the cross walls that are located within a periphery of the support body, wherein the at least one intermediate wall is free from tubular cavities located therein; and, alignment means located in a lower part of the support body for aligning the support block itself with respect to a defined installation zone, an upper cover section configured to cover and seal an upper part of each of the first plurality of hollow sections and each of the second plurality of hollow sections to define independent and individual plenum chambers in each of the first plurality of hollow sections and each of the second plurality of hollow sections, and one or more perforations in the upper cover section of each of the independent and individual plenum chambers.

2. The support block with individual hollow sections, for a machine for forming glass articles as claimed in claim 1, wherein each front wall and rear wall include an open side hole in registration with each first hollow section and second hollow section.

3. The support block with individual hollow sections, for a machine for forming glass articles as claimed in claim 2, further including: individual cover caps for covering a respective each one of the open side holes of each of the first hollow sections and each of the second hollow sections, the individual cover caps being coupled and uncoupled at a side of either the front wall or rear wall, the individual cover caps configured to separately open or close the respective each one of open side holes of each one of the first hollow section and each one of the second hollow sections for repair or maintenance of the one or more mechanisms, the one or more mechanisms being associated with a respective article-forming section; and, a lower cover section to cover and seal a lower part of each of the first plurality of hollow sections and each of the second plurality of hollow sections, for the configuration of the independent and individual plenum chambers, said upper cover section supporting each of the one or more mechanisms used in at least one of parison forming stations or final blowing stations of glass articles.

4. The support block with individual hollow sections, for a machine for forming glass articles as claimed in claim 3, wherein the lower cover section for covering the lower part of each of the first plurality of hollow sections and each of the second plurality of hollow sections includes a central hole for connecting ducts for the introduction of pressurized air to each of said independent and individual plenum chambers.

5. The support block with individual hollow sections, for a machine for forming glass articles as claimed in claim 1, wherein the support body, in a single piece, includes a support base.

6. The support block with individual hollow sections, for a machine for forming glass articles as claimed a claim 1, wherein said support block includes hollow support sections located at respective ends of said support block; and a cover for covering a top of hollow support sections.

7. The support block with individual hollow sections, for a machine for forming glass articles as claimed in claim 1, wherein the alignment means are adjusting bolts.

8. The support block with individual hollow sections, for a machine for forming glass articles as claimed in claim 1, wherein the support block is manufactured by casting with a selected material consisting of ductile or nodular iron or gray iron.

9. The support block with individual hollow sections, for a machine for forming glass articles as claimed in claim 1, wherein the front wall, the rear wall, the side walls, the at least one intermediate wall, and the plurality of cross walls of the support body are welded-joined, single piece steel plates.

* * * * *